Aug. 7, 1945. C. J. KOPP 2,380,972
AUTOMATIC CONTROL OR INDICATOR
Filed Jan. 1, 1943 2 Sheets-Sheet 1
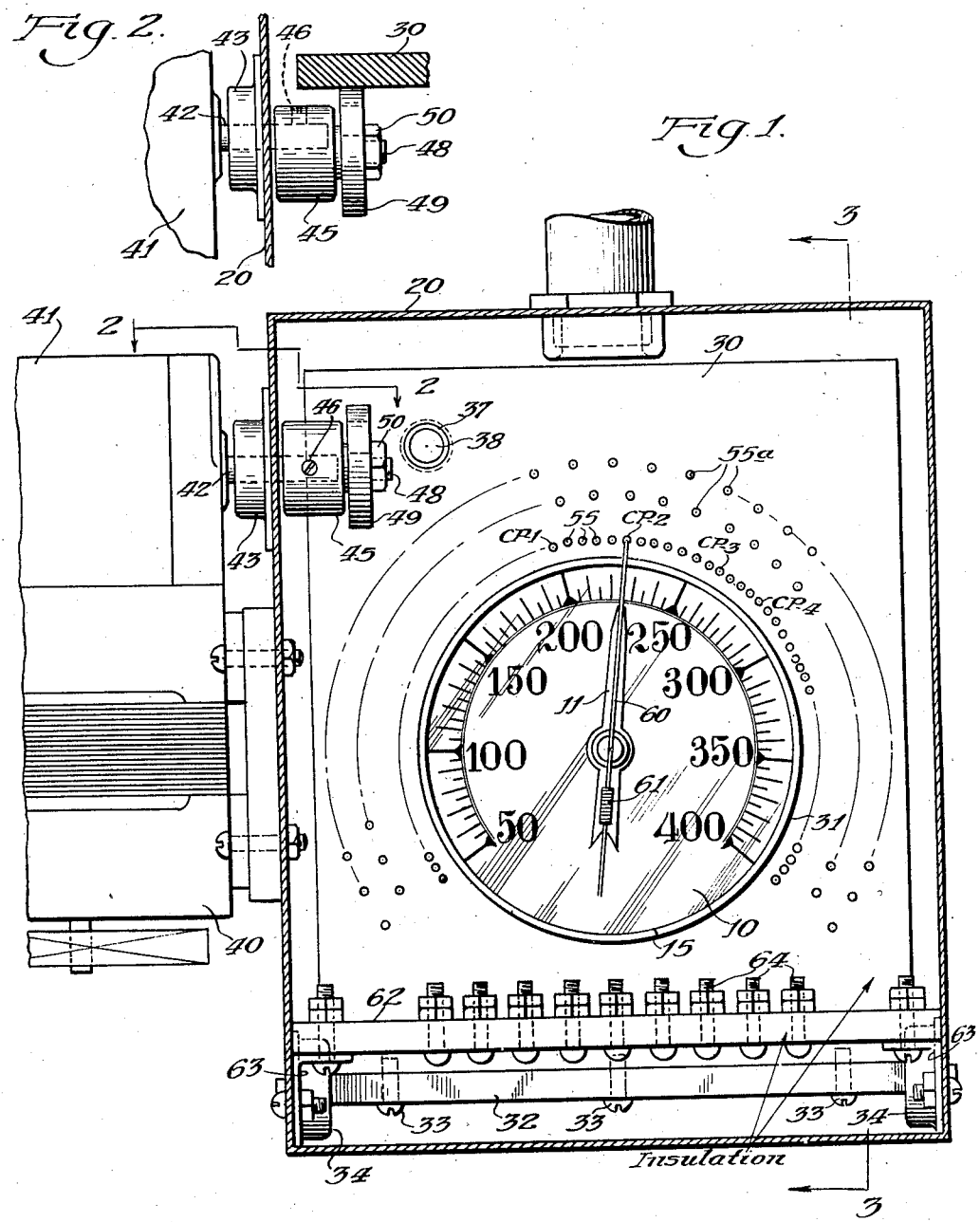
Inventor:
Carl J. Kopp,
By: Lee J. Gary
Attorney

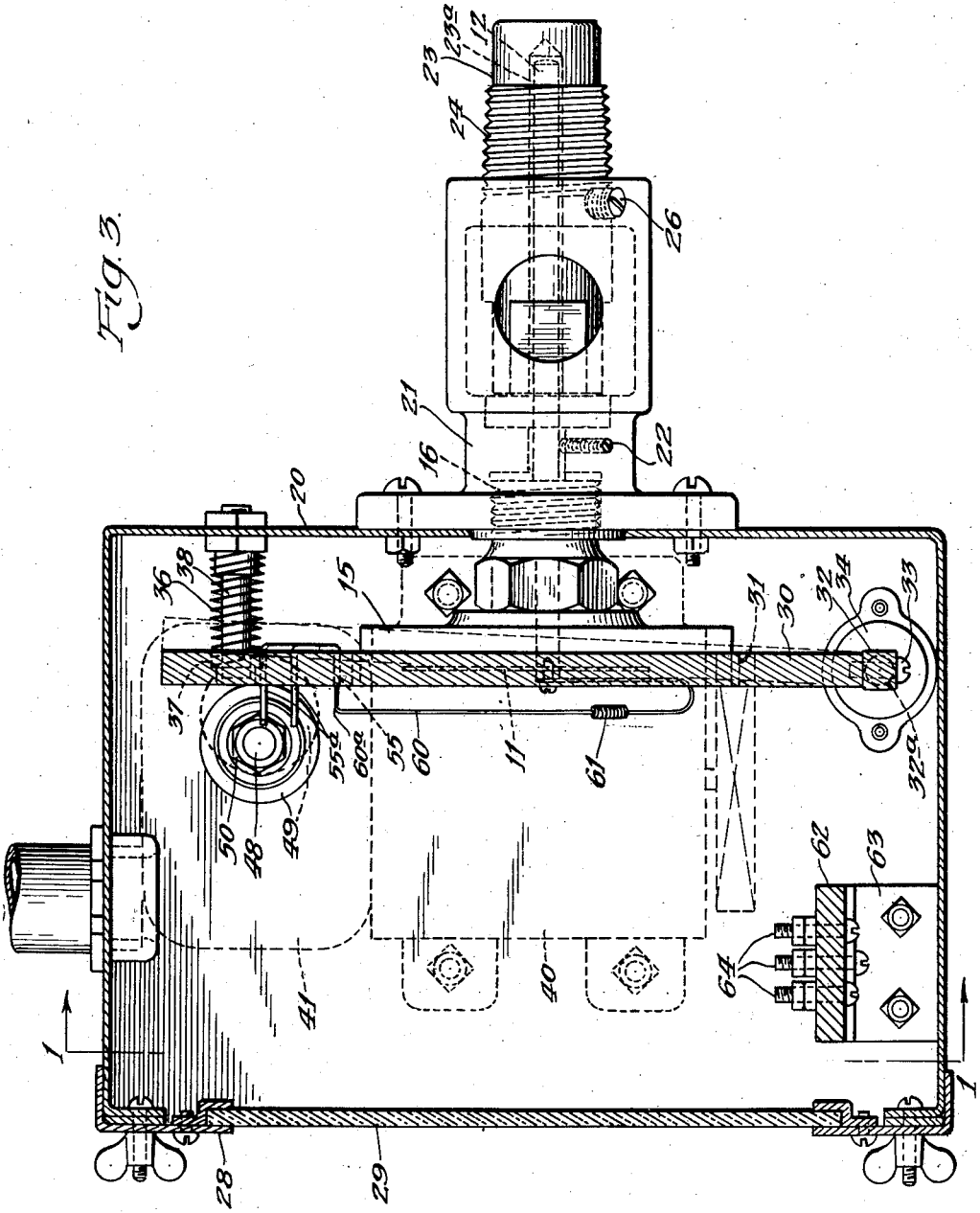

Patented Aug. 7, 1945

2,380,972

UNITED STATES PATENT OFFICE 2,380,972

AUTOMATIC CONTROL OR INDICATOR

Carl J. Kopp, Chicago, Ill., assignor to Federal Electric Company, Inc., Chicago, Ill., a corporation of New York Application January 1, 1943, Serial No. 470,967

10 Claims. (Cl. 200—56)

This invention relates to a novel form of device of the type adapted to function as a control or as an indicating device. In its broad aspect the present invention is adapted for automatically controlling various electrically operating auxiliary devices in response to gradual change of recording or indicating instruments of the dial or gauge types, such as may be used for measuring temperatures, pressures, speeds, weights, or other characteristics to be measured or indicated. Devices embodying the present invention are also adapted for efficient use in connection with various types of indicating or recording apparatus such as, for example, time controlled apparatus for recording in the form of graphs or record charts, the variations or changes in temperatures, pressures, weights, speeds, measurements of electrical characteristics, etc. The device may also be utilized for operating remotely located indicating or recording devices.

One of the objects of this invention is to provide a novel device of the character indicated wherein a plurality of separate electrically operated devices may be actuated in a predetermined sequence in response to changes in certain characteristics of measurement or indication.

Another object is to provide a novel device of the character indicated wherein a plurality of separate electrically actuated devices may be sequentially actuated in response to changes in certain characteristics of measurement or indication, and wherein quick and easy adjustment may be conveniently made for changing the sequence of operation of said electrically operated devices, or for rendering them responsive to different measurements or indications.

A further object is to provide a novel and improved device of the character indicated which permits obtaining complete automatic cyclic control for starting and/or stopping in predetermined sequence, the operation of a plurality of separate electrically operated devices or apparatus.

Still another object is to provide a novel device of the character indicated, characterized by the provision of an arm movable in response to gradual change in characteristics to be measured or indicated, together with a cooperating, rapidly oscillating means for periodically and intermittently engaging the end of said arm.

Other objects and advantages of this invention will be apparent from the following description, taken in connection with the accompanying drawings in which:

Fig. 1 is a view, part in elevation and part in section, of the device embodying the present invention, taken substantially as indicated at lines 1—1 on Fig. 3.

Fig. 2 is a fragmentary sectional view through the device, taken substantially as indicated at lines 2—2 on Fig. 1.

Fig. 3 is a vertical section through the device, taken as indicated at lines 3—3 on Fig. 1.

The device embodying the present invention is adapted to a relatively wide field of use, and may be used either as a control for operating a plurality of separate electrically energized devices or apparatus, or may be used as an indicating device in conjunction with suitable type of recording instruments, or may also be used for operating remotely located indicating devices. When the device is to be used as a control unit in conjunction with various types of instruments of measurement or indication, it is so arranged as to be rendered responsive to changes in measurement or indication and by virtue of which automatic control of various other electric devices may be attained.

For purpose of illustration my novel device is shown in connection with a Fahrenheit thermometer of the type including a graduated dial 10, and a rotatable indicator 11 which, it may be understood, is connected to a suitable bi-metallic element enclosed within a coaxial, rearwardly extending tube 12. It is to be understood that the thermometer herein illustrated is of a conventional, commercial form and includes a circular dial housing 15, and connected to the rear side of which is a threaded member 16, adapted to be threaded in a support for conveniently and firmly securing the thermometer instrument in place, with the tube 12 containing the bi-metallic element, adapted to be disposed in close proximity to the area at which it is to be used for causing the bi-metal to rotate the indicator 11 for indicating the temperature.

In the construction as illustrated in the drawings, my improved device includes a sheet metal housing 20, connected to the rear side of which is a flanged sleeve 21, into which the threaded section 16 of the thermometer may be conveniently threaded for permanent securement thereof in position. The tube 12 of the thermometer is rigidly anchored in position in the sleeve 21 by means of a set screw 22. For convenience in mounting and removal of the entire instrument in and from a suitable position of use, a suitable adaptor plug 23 is employed. This plug includes a threaded section 24 for threading into an opening in the machine with which the device is to be used, such as for example, a molding machine. The upper end of the plug 23 is preferably formed of polygonal shape for convenient engagement of a tool for detachably connecting the plug 23 in the machine. The body portion of the plug is dimensioned for a snug telescopic fit within the sleeve 21 and is formed with a central bore 23a for accommodating the extension of the tube 12 of the thermometer. After the plug 23 is mounted in position in the machine or other apparatus with which it is to be used, the device, including the thermometer may be quickly and easily mounted in position upon the plug, and rigidly secured in position thereon by means of a set screw 26.

The sheet metal housing 20 is of generally rectangular form, as may be seen in the drawings, and the face or front side thereof includes a removable frame 28 containing a glass panel 29 so as to permit convenient access to the interior of the housing and also reading of the graduated dial 10 of the thermometer, through the glass panel. Rockably mounted in the housing is an upright panel 30 of insulating material which is provided with an opening 31 of sufficient size to permit the panel to surround the housing 15 of the thermometer and afford adequate clearance so that the panel may be moved relatively to the thermometer housing in an oscillating manner from the full line to the dotted line position indicated in Fig. 3 of the drawings. The lower edge of the panel 30 is mounted upon and is rigidly secured to a square shaft 32 by means of screws 33, the ends of said shaft being formed cylindrical, to form trunnions 32a as seen in Fig. 3, journalled in ball bearing races, indicated at 34, rigidly mounted on the interior side walls of the housing 20.

The upper end of the panel 30 is yieldingly urged in a forward direction by means of a coil spring 36 seated at its forward end in a shouldered recess 37 formed in the panel. Said spring is telescoped over a stud 38, rigidly secured to the back wall of the housing 20, the forward end of the stud extending freely through the aperture 37 in the panel, thus serving to confine the spring 36 in proper position, while allowing freedom of movement thereof in exerting a yielding force on the panel 30.

The panel is oscillated about the trunnions 32a, by a power driven mechanism which comprises an electric motor 40, secured to the outside side wall of the housing 20. Attached to the motor is a speed reducing mechanism indicated at 41, including a drive shaft 42, extending through a ball bearing race 43, secured to the exterior of the side wall of the housing, the shaft projecting a substantial distance within the housing. Rigidly mounted on the shaft, within the housing, is an eccentric block 45 which is secured in position thereon by a set screw 46. The eccentric block includes a centrally disposed crank pin 48 on which is mounted a roller 49, including a centrally located ball bearing race (not shown), the roller being confined in position on said pin by a nut 50. Due to the offset relationship of the drive shaft 42, in the eccentric block 45, to the crank pin 48, it will be seen that as the shaft 42 rotates the crank pin 48 rotates in an orbit about the axis of the shaft 42 and thereby moves the roller 49 therewith through an orbit about the axis of the shaft 42. Due, however, to the pressure of the spring 36 against the rear side of the panel 30, the panel is constantly maintained in yielding contact with the periphery of the roller 49, and as the crank pin 48 rotates through its orbit, carrying the roller 49 therewith, the roller is caused to merely rock or roll back and forth against the face of the panel. Thus, there is no appreciable frictional wear between the roller 49 and the panel due to the rolling action of the roller on the surface of the panel.

Surrounding the circular aperture 31 of the upright panel 30, is an arcuately arranged series of contacts 55 which, for illustration are shown spaced apart at intervals corresponding to 5° F., of the graduated thermometer dial 10. It is to be understood, of course, that the contacts 55 may be spaced apart any desired angular amount. Due, however, to the relatively close spacing of the contacts it is impractical to connect each of said contacts with other contacts or conductor wires. Accordingly, the contacts are each formed of a piece of wire bent in generally U-shaped formation, the end of one of the legs of the piece of wire being disposed flush with the face of the panel to constitute the contact surface. The intermediate portion of the wire contact being disposed against the rear face of the panel while the other leg thereof projects through the panel in spaced apart relation to the contact face and provides a terminal extension 55a to which a suitable clip of a conductor wire may be conveniently attached. For convenience in attaching or removing the clips or conductor wires from the terminal portion 55a, I prefer that alternate contacts be made of different sizes, with the legs thereof spaced apart different distances, so that the terminal portion 55a of alternate contacts will be disposed in staggered, offset radial relation, as may be seen in Fig. 1 of the drawings.

In adapting the conventional, commercially available Fahrenheit thermometer as part of the present invention, the glass cover plate is removed. Mounted in fixed relation to the indicator 11 of the thermometer is a contact or detector arm 60, the free end of which extends beyond the graduated dial face 10, and continues into an inturned terminal contacting portion 60a, adapted to engage the faces of the contacts 55 or the surface of the panel intermediate contact faces, when the panel is in the position seen in Fig. 3 of the drawings. In order to balance the contact arm 60 so that the indicator 11 will be accurate and will correctly indicated exact temperatures, the opposite end of the contact arm 60 is provided with a weight 61, frictionally mounted on the arm so as to permit relatively fine adjustment therealong.

The contact arm is of an electrically conducting material and is grounded through the shaft carrying the indicator 11 of the thermometer, the tube 12, the sleeve 21 and the plug 23 to the machine on which the device is mounted. It will now be apparent that as the panel 30 oscillates back and forth, the face of the panel or the face of one of the contacts 55 will engage the terminal end 60a, of the contact arm 60. It is to be understood that only certain of the contacts 55 are connected in electrical circuits for controlling auxiliary electrically operated devices or apparatus. It will be apparent, however, that if desired the terminal portion 55a of any one or more of the contacts may be connected into the electrical circuits to be controlled.

Mounted inside of the housing 20 on the base thereof, is a horizontally disposed insulating panel 62 connected at its opposite ends to angle clips 63, secured to the side walls of the housing. Mounted upon the panel 62 are a plurality of terminal parts 64 to which may be connected conductor wires having terminal clips adapted to be selectively engaged with a desired terminal portion 55a of the contacts 55. Other conductor wires are connected to corresponding terminals 64 to complete the electrical circuit to be controlled, when the contact arm 60 engages the corresponding contact which is a part of said electrical circuit.

It has been found that satisfactory results may be obtained when the gear reduction mechanism 41 is of such nature as to effect oscillation of the panel 30, approximately eighty times a minute. Obviously the speed of oscillation of the panel may be increased or decreased as desired for some specific application of the device. By virtue of the high speed of oscillation of the panel, the contact arm 60 is substantially free at all times to move with the thermometer indicator 11 to indicate changes in temperature. By virtue of such construction there is no appreciable frictional drag on the end of the contact arm during gradual movement with the indicator 11, of the thermometer, thus the thermometer is permitted to accurately indicate correct temperatures at all times, and permits contact arm 60 to temporarily engage the contact 55, which corresponds to the temperature indicated by the indicator 11. If the terminal end of the contact arm were permitted to merely move across a stationary face of the panel on which the contacts are disposed, there would be considerable frictional drag and would result in inaccurate temperature indications and would likewise effect improper and inaccurate operation of other devices to be controlled. For certain uses of the device embodying the present invention, such as where the indicator of the measuring or indicating instrument is apt to move rather rapidly, it would then be desired to oscillate the panel 30 at a higher rate of speed in order to reduce to a minimum the frictional drag which would result from temporary encounter of the terminal end of contact arm 60, moving over the face of the panel, and the faces of the contacts 55, and to insure that the contact arm engages each of the contacts 55, in its movement with the indicator 11 around the dial.

While the herein disclosed arrangement of contacts is entirely satisfactory, when the instrument with which it is used is in the nature of a thermometer or pressure indicator or speed indicator, it may be desirable, when the device is to be used for controlling relatively sensitive circuits such as for measuring or indicating electrical characteristics, to employ an arcuately arranged resistance strip as a means for picking off voltage indications at any angular position of adjustment of the contact arm 60.

It will be apparent that because of the construction herein disclosed it will be possible to obtain relatively exact indications or readings because there is no appreciable frictional drag or resistance to the contact arm by reason of its intermittent contact while moving along the resistance strip. Moreover, the contact arm 60 being of extremely light weight, permits obtaining relatively great sensitivity as a detector in certain electrical circuits to be made through the contacts 55.

The device constituting the present invention including a thermometer is especially suitable for use as a control device in connection with various machines, such as plastic presses or molding machines wherein control of temperature is relatively important and wherein the control device may be utilized so as to actuate a plurality of electrically controlled devices or apparatus in a predetermined sequence or cycle in response to temperature changes of the molds. For example, it is possible with the use of my novel control device to have different operations performed during the portion of the cycle of operation from the cold to hot, as compared with those which are to be performed during the portion of the cycle of operation from the hot to the cold. This is accomplished notwithstanding the fact that control arm 60 engages the same contacts in each half of the cycle of operation in reverse order.

I claim as my invention:

1. For use with an indicating instrument including a graduated scale member and a cooperating indicating member, and wherein one of said members is movable relatively to the other, to indicate an increase or decrease in the characteristics being measured or indicated; a switch device comprising a relatively light weight contact arm adapted to be mounted in fixed relation to and movable with said movable member, said arm including a terminal contacting portion adapted to extend laterally beyond the marginal edge of said graduated scale member, a member adapted to be disposed adjacent said instrument, in registration with the terminal contacting portion of said arm, and means for rapidly oscillating said last mentioned member into and out of intermittent contact with said terminal contacting portion of said arm.

2. For use with an indicating instrument including a graduated scale member and a cooperating indicating member, and wherein one of said members is movable relatively to the other, to indicate an increase or decrease in the characteristics being measured or indicated; a switch device comprising a relatively light weight contact arm adapted to be mounted in fixed relation to and movable with said movable member, said arm including a terminal contacting portion adapted to extend laterally beyond the marginal edge of said graduated scale member, a member adapted to be disposed adjacent said instrument, in registration with the terminal contacting portion of said arm, and means for rapidly oscillating said last mentioned member about a pivot axis, into and out of intermittent contact with said terminal contacting portion of said arm.

3. For use with an indicating instrument including a graduated scale member and a cooperating indicating member, and wherein one of said members is movable relatively to the other, to indicate an increase or decrease in the characteristics being measured or indicated; a switch device comprising a terminal contacting portion adapted to be connected to the movable member and extend laterally beyond the marginal edge of said graduated scale, a member adapted to be disposed adjacent said instrument, in registration with said terminal contacting portion, and means for rapidly oscillating said last mentioned member into and out of intermittent contact with said terminal contacting portion.

4. For use with an indicating instrument including an element movable in response to increase or decrease in the characteristics to be measured or indicated; a switch device comprising a terminal contacting portion adapted to be connected to the movable element, means disposed adjacent said terminal contacting portion, and means for rapidly oscillating said means into and out of intermittent contact with said terminal contacting portion.

5. For use with an indicating instrument including a graduated scale member and an indicating member, and wherein one of said members is movable relatively to the other, to indicate an increase or decrease in the characteristics being measured or indicated; a switch device comprising a relatively light weight contact arm adapted to be mounted in fixed relation to and movable with said movable member, said arm including a contact terminal portion adapted to be disposed laterally beyond the movable member, a panel of insulating material disposed adjacent said contact terminal portion of the arm, said arm being adapted for construction in an electrical circuit, said panel having contact means thereon disposed for registration with said contact terminal portion of the arm, throughout a substantial range of indicating adjustment, said contact means including a multiplicity of spaced apart terminal connections corresponding to certain positions of adjustment of the scale member and indicating member, and adapted to be connected to conductor wires in a separate electrical circuit including said contact arm, and means for rapidly oscillating said panel for causing said contact means to intermittently engage the contact terminal of said arm for temporarily completing an electrical circuit including a terminal of the contact means which corresponds to a certain relative position of indicating adjustment of said instrument.

6. For use with an indicating instrument including a graduated scale member and an indicating member, and wherein one of said members is movable relatively to the other, to indicate an increase or decrease in the characteristics being measured or indicated; a switch device comprising a relatively light weight contact arm adapted to be mounted in fixed relation to and movable with said movable member, said arm including a contact terminal portion adapted to be disposed laterally beyond the movable member, a rockably mounted panel of insulating material adapted to be disposed in surrounding relation to said scale member and indicating member adjacent said contact terminal portion of the arm, said arm being adapted for connection in an electrical circuit, said panel having contact means thereon disposed for registration with said contact terminal portion of the arm, throughout a substantial range of indicating adjustment, said contact means including a multiplicity of spaced apart terminal connections corresponding to certain positions of adjustment of the scale member and indicating member, and adapted to be connected to conductor wires in a separate electrical circuit including said contact arm, and means for rapidly oscillating said panel about its rockable connection for causing said contact means to intermittently engage the contact terminal of said arm for temporarily completing an electrical circuit including a terminal of the contact means which corresponds to a certain relative position of indicating adjustment of said instrument.

7. For use with an indicating instrument including a graduated scale member, and an indicating member, and wherein one of said members is rotatable relatively to the other to indicate an increase or decrease in the characteristics being measured or indicated; a switch device comprising a relatively light weight contact arm adapted to be mounted in fixed relation to and movable with said rotatable member, said arm being connected in an electrical circuit and including a contact terminal portion adapted to be disposed laterally beyond the rotatable member, a panel of insulating material disposed adjacent said contact terminal portion of the arm, arcuately disposed contact means on said panel in registration with the terminal portion of the arm, said contact means including a multiplicity of terminal connections corresponding to certain positions of adjustment of the said instrument members, and adapted to be connected to conductor wires in separate electrical circuits including the contact arm, and means for rapidly oscillating said panel to cause intermittent engagement of said contact means with the terminal portion of said arm, whereby to temporarily complete an electrical circuit including a terminal of the contact means which corresponds to a certain relative position of indicating adjustment of said instrument.

8. For use with an indicating instrument including a graduated scale member, and an indicating member, and wherein one of said members is rotatable relatively to the other to indicate an increase or decrease in the characteristics being measured or indicated; a switch device comprising a relatively light weight contact arm adapted to be mounted in fixed relation to and movable with said rotatable member, said arm being connected in an electrical circuit and including a contact terminal portion adapted to be disposed laterally beyond the rotatable member, a rockably mounted panel of insulating material adapted to be disposed in surrounding relation to said scale and indicating members adjacent said contact terminal portion of the arm, arcuately disposed contact means on said panel in registration with the terminal portion of the arm, said contact means including a multiplicity of terminal connections corresponding to certain positions of adjustment of the said instrument members, and adapted to be connected to conductor wires in separate electrical circuits including the contact arm, and means for rapidly oscillating said panel about its rockable connection to cause intermittent engagement of said contact means with the terminal portion of said arm, whereby to temporarily complete an electrical circuit including a terminal of the contact means which corresponds to a certain relative position of indicating adjustment of said instrument.

9. For use with an indicating instrument including a graduated scale member, and an indicating member, and wherein one of said members is rotatable relatively to the other to indicate an increase or decrease in the characteristics being measured or indicated; a switch device comprising a relatively light weight contact arm adapted to be mounted in fixed relation to and movable with said rotatable member, said arm being connected in an electrical circuit and including a contact terminal portion adapted to be disposed laterally beyond the rotatable member, a panel of insulating material disposed adjacent said contact terminal portion of the arm, an arcuately arranged series of spaced apart contact points disposed in registration with said terminal portion of said arm throughout a portion of its range of rotative adjustment and corresponding to certain positions of adjustment of said instrument members, and adapted to be connected to conductor wires in separate electrical circuits including the contact arm, and means for rapidly oscillating said panel to cause intermittent engagement of a contact point in alignment with the terminal portion of said arm, whereby to temporarily complete an electrical circuit including said contact point which corresponds to a certain relative position of indicating adjustment of said instrument.

10. For use with an indicating instrument including a graduated scale member and an indicating member, and wherein one of said members is movable relatively to the other, to indicate an increase or decrease in the characteristics being measured or indicated; a switch device comprising a relatively light weight contact arm adapted to be mounted in fixed relation to and movable with said movable member, said arm including a contact terminal portion adapted to be disposed laterally beyond the movable member, a rockably mounted panel of insulating material adapted to be disposed in surrounding relation to said scale member and indicating member adjacent said contact terminal portion of the arm, said arm being adapted for connection in an electrical circuit, said panel having contact means thereon disposed for registration with said contact terminal portion of the arm, throughout a substantial range of indicating adjustment, said contact means including a multiplicity of spaced apart terminal connections corresponding to certain positions of adjustment of the scale member and indicating member, and adapted to be connected to conductor wires in a separate electrical circuit including said contact arm, and means for rapidly oscillating said panel about its rockable connection for causing said contact means to intermittently engage the contact terminal of said arm for temporarily completing an electrical circuit including a terminal of the contact means which corresponds to a certain relative position of indicating adjustment of said instrument, said oscillating means including a motor, speed reducing mechanism having a drive shaft, eccentrically movable means on said shaft engaging the face of the panel remote from the rockable connection, and a coil spring reacting against the opposite side of said panel to maintain it in continuous engagement with said eccentrically movable means.

CARL J. KOPP.